(12) United States Patent
Zimmermann et al.

(10) Patent No.: US 10,177,448 B2
(45) Date of Patent: Jan. 8, 2019

(54) ANTENNA SYSTEM

(71) Applicant: KATHREIN-Werke KG, Rosenheim (DE)

(72) Inventors: Lars Zimmermann, Rohrdorf (DE); Michael Oberberger, Rosenheim (DE)

(73) Assignee: KATHREIN SE, Rosenheim (DE)

(*) Notice: Subject to any disclaimer, the term of this patent is extended or adjusted under 35 U.S.C. 154(b) by 0 days.

(21) Appl. No.: 15/021,565

(22) PCT Filed: Sep. 4, 2014

(86) PCT No.: PCT/EP2014/068884
§ 371 (c)(1),
(2) Date: Mar. 11, 2016

(87) PCT Pub. No.: WO2015/036319
PCT Pub. Date: Mar. 19, 2015

(65) Prior Publication Data
US 2016/0226134 A1  Aug. 4, 2016

(30) Foreign Application Priority Data

Sep. 13, 2013 (GB) .................................. 1316323.3

(51) Int. Cl.
*H01Q 1/24* (2006.01)
*H01Q 21/30* (2006.01)
*H04W 88/08* (2009.01)

(52) U.S. Cl.
CPC ............. *H01Q 1/246* (2013.01); *H01Q 21/30* (2013.01); *H04W 88/08* (2013.01); *H04W 88/085* (2013.01)

(58) Field of Classification Search
CPC .......... H01Q 1/246; H01Q 3/30; H01Q 21/30; H04W 88/085; H04W 36/38; H04W 88/08

See application file for complete search history.

(56) References Cited

U.S. PATENT DOCUMENTS

| 7,099,695 B1 * | 8/2006 | Ngan ................... H04W 16/00 455/101 |
| 8,688,033 B2 | 4/2014 | Seeor et al. |

(Continued)

FOREIGN PATENT DOCUMENTS

| CN | 102415206 | 4/2012 |
| DE | 10 2009 022158 | 11/2010 |

(Continued)

OTHER PUBLICATIONS

"Antenna Interface Standards Group, Standard No. AISG V2.0. Control Interface for Antenna Line Devices", internet citation, Jun. 13, 2006, XP008131526, http://www.torni.fi/aisg/AISG%20v2.0%20.pdf.

(Continued)

*Primary Examiner* — George Eng
*Assistant Examiner* — Jing Gao
(74) *Attorney, Agent, or Firm* — Dann, Dorfman, Herrell and Skillman; Stephen Eland

(57) ABSTRACT

An adapter (10) comprises a single adapter output (45) connectable to at least one antenna line device (100*a-c*), at least two base station inputs (30*a-c*), the at least two base station inputs (30*a-c*) being individually connectable to a base station (110*a-c*) or a primary control device (460*c*) and at least one microcontroller (40*a-c*), the microcontroller (40*a-c*) being connected between one of the base station inputs (30*a-c*) and the single adapter output (45). An antenna system (5) comprising such an adapter (10) and a plurality of antenna line devices (100*a-c*) connected to the single adapter output (45) of the adapter is also disclosed. A method for operating the radio antenna (10) having a plurality of antenna line devices (100*a-c*) from at least two base stations (110*a-c*) is disclosed.

8 Claims, 3 Drawing Sheets

(56) References Cited

U.S. PATENT DOCUMENTS

| | | | |
|---|---|---|---|
| 8,981,894 B2 | 3/2015 | Mann et al. | |
| 2012/0038513 A1* | 2/2012 | Li | H01Q 1/246 |
| | | | 342/372 |
| 2012/0062356 A1* | 3/2012 | Mann | H01Q 21/08 |
| | | | 340/3.5 |
| 2014/0022124 A1* | 1/2014 | Zimmermann | H01Q 1/246 |
| | | | 342/368 |

FOREIGN PATENT DOCUMENTS

| | | |
|---|---|---|
| DE | 10 2011 015 551 | 12/2012 |
| EP | 2469790 | 6/2012 |
| EP | 2469790 A1 * | 6/2012 |
| EP | 2340683 | 11/2012 |
| KR | 1020070063660 | 6/2007 |
| WO | 2010/133352 | 11/2010 |

OTHER PUBLICATIONS

International Search Report for PCT/EP14/68884 dated Nov. 20, 2014.
Search Report for GB Appl. No. 1316323.3 dated Feb. 3, 2014.
Official Action issued in Chinese Patent Application No. 201480059451.0 dated Feb. 5, 2018.
Translation of Official Action issued in Chinese Patent Application No. 201480059451.0 dated Feb. 5, 2018.

* cited by examiner

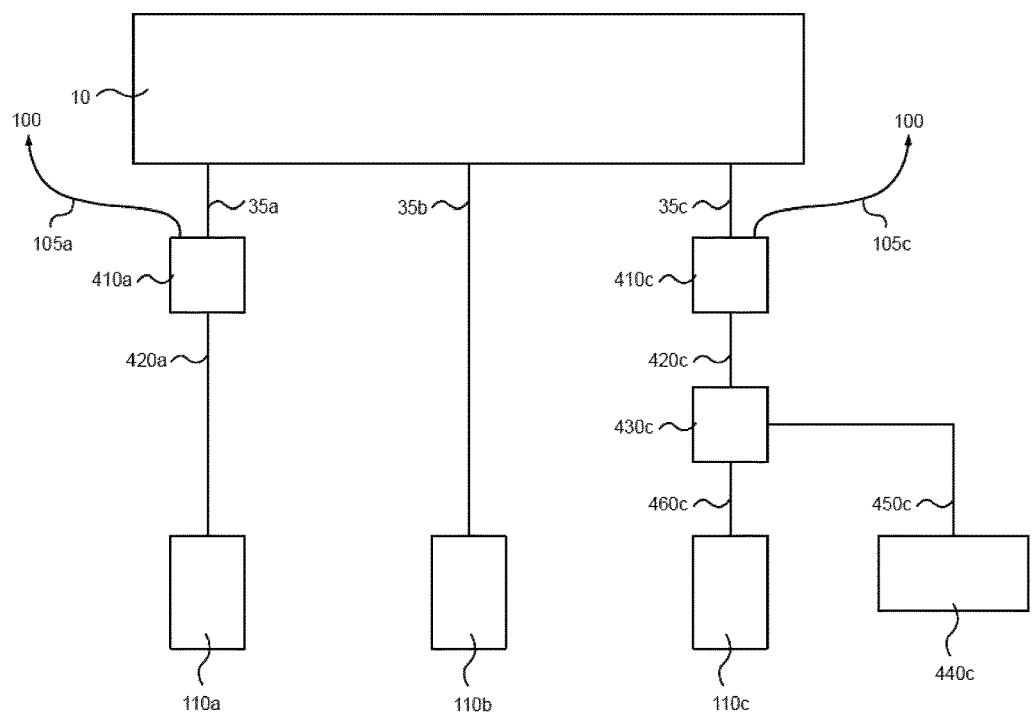

ANTENNA SYSTEM

CROSS-REFERENCE TO RELATED APPLICATIONS

This application is a national phase entry of international patent application No. PCT/EP2014/06888, filed on 4 Sep. 2014, which claims priority to UK Patent Application No. GB 1316323.3, filed on 13 Sep. 2013. The entire disclosure of UK Patent Application No. GB 1316323.3 is hereby incorporated by reference.

FIELD OF THE INVENTION

The field of the invention relates to an adapter for a radio antenna system for operating at least one antenna line device and a method for operating the antenna line device.

BACKGROUND OF THE INVENTION

A wireless base station is used together with a radio antenna in a mobile communication to communicate with a mobile station or hand-held phone. For example, in a wireless telephone system, the signals from one or more of the mobile telephones in an area are received at a nearby base station. The base station connects the call to the backbone of the network over a fixed line or by radio transmission.

Modern radio antennas include a number of antenna line devices that are used to control and monitor various aspects of the radio antenna. It is easy for a single base station to send control signals to the antenna line device (ALD) in the radio antenna. Issues arise, however, when a number of base stations or similar devices, such as but not limited to a node B, are co-located and wish to send control signals to a multi band radio antenna with a plurality of subunit ALDs. This plurality of ALDs is addressed through a single control interface, in accordance with the AISG (Antenna Interface Standard Group) standard. International patent application WO 2010/133352 (Kathrein) teaches, for example, such a system in which each one of the antenna line devices can communicate bi-directionally over a common external communications bus with a remote control unit. The multi-band radio antenna disclosed in this specification cannot be addressed by multiple base stations or Node Bs.

German patent application No. DE 10 2011 015 551 (Kathrein) teaches a system in which a so-called site sharing adapter is used to communicate the control signals to one or more of the antenna line devices using carrier signals at different frequencies for different ones of the base stations.

European Patent No. EP 2 340 683 (Kathrein) also teaches a system in which multiple base stations occupying a single site. The base stations are connected to a plurality of antennas, including ALDs, for the transmission of radio signals using the corresponding protocols. The ALDs can be addressed by various base stations and the ALD control signals are decoupled from each other by multiplexing.

European Patent No. EP 2 469 790 (Huawei) discloses a method and system for transmitting radio signals. The method comprises receiving AISG protocol signals sent by one or more local devices and adding labels to the AISG protocol signals. These labels are used to identify mapping relationships between the antenna line devices and the base station. The AISG protocol signals from the internal line devices are combined together in a data packet and sent to an adapter through a shared field.

Kathrein Werke had also sold a tower-mounted amplifier under product reference DTMA-1800-UMTS-12-AISG. This tower-mounted amplifier (TMA) receives the signals from one of the base station and passes the signals directly through to a remote electrical tilt device.

Korean Patent No. KR 20070063660 (SK Telecom) discloses an apparatus for sharing an antenna feeding line. The apparatus includes a base station device comprising transmission and reception units, antennas, and a two frequency transformers. A common feeding line is used from each of the transmission and reception units to the antennas. A first frequency transformer transforms a signal of a plurality of transmission and reception units to a signal of a different frequency band, and transmits the transformed signal to the antennas through the common feeding line. The second frequency transformer reproduces a signal having an original frequency band, and outputs through a plurality of outputs the reproduced signal to the antennas.

SUMMARY OF THE INVENTION

An adapter for use in a radio antenna system is disclosed. The adapter comprises a single adapter output connectable to at least one antenna line device and at least two base station inputs, The at least two base station inputs are individually connectable to at least one of a base station or a primary control device. The adapter further comprises at least one microcontroller connected between the at least two base station inputs and the single adapter output. The adapter enables the antenna line devices in the radio antenna to be addressed by multiple base stations (or primary control devices).

The adapter further includes a managements unit for managing outputs from the microcontroller to the single antenna output. The management unit includes at least a synchronisation unit to ensure that two of the microcontrollers do not try to address the bus connected to the single antenna output at the same time.

The adapter can be used in an antenna system with a plurality of antenna line devices. The antenna line devices can be daisy-chained together or connected in a tree-like structure. Non-limiting examples of the antenna line devices include a RET device, an azimuth sensor, a position sensor, or a temperature sensor. Communication between the adapter and the antenna line devices is carried out under the RS 485 standard.

A method for operating at least one radio antenna having a plurality of antenna line devices from at least two base stations is also disclosed. The method comprises receiving antenna line device control signals from at least one of the at least two base stations in a microcontroller in the adapter, converting the ALD control signals in the microcontroller, passing the converted ALD control signals to a single output of the adapter, and sending, via an adapted antenna connector, the converted ALD control signals to an addressed one of the at least one antenna line devices.

The ALD control signals use the Antenna Interface Standard Group (AISG) protocol or a modified form thereof.

DESCRIPTION OF THE FIGURES

FIG. 4 shows examples of connection of the base station to the adapter.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
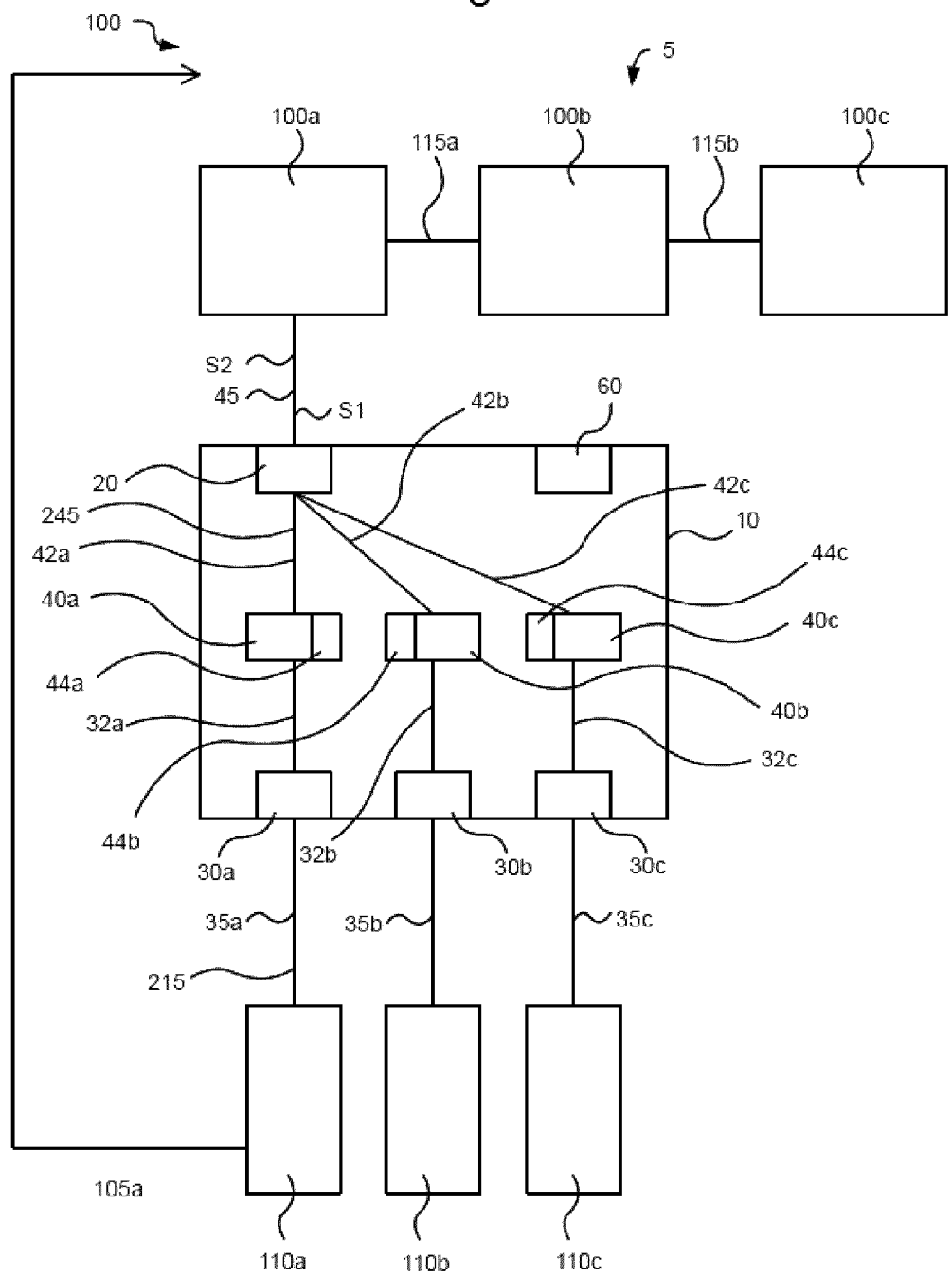
FIG. 1 shows an overview of a radio antenna system.

FIG. 1 shows a radio antenna system 5 that is incorporated into a mobile telecommunications system, such as a GSM, UMTS, LTE, WiMAX system. The radio antenna system 5 comprises an adapter 10 that is connected to a radio antenna 100 and to one or more primary control devices or base stations 110a-c. The adapter 10 has a plurality of base station inputs 30a-c. Each one of the base station inputs 30a-c is connected to one of the primary control devices or base stations 110a-c by a corresponding adapter-base station-connection 35a-c. The adapter-base station-connection 35a-c is formed by a twisted pair and carries signals using the RS 485 protocol.

It will be appreciated that the use of the words "input" and "output" in this disclosure does not imply that the connection are unidirectional. In many cases, the connections are bidirectional and both control signals and RF signal can be both received and transmitted through the same port.

The radio antenna 100 has a plurality of antenna line devices 100a-c, which are connected together by antenna devices connections 115a-b. Three antenna line devices (ALD) 100a-c are shown in FIG. 1. Examples of the antenna line devices 100a-c include, but are not limited to, azimuth sensors, remote electrical tilt (RET) motors and controls, position sensors and temperature sensors. The antenna line devices 100a-c are shown connected in a daisy chain (serial) manner in FIG. 1. It would be possible to connect one or more of the antenna line devices 100a-c in parallel or having a tree-like structure. FIG. 1 shows a single radio antenna 100. The teachings of this disclosure are not limited to single radio antennas 100 and are equally applicable to a plurality of ALDs 100a-c in several radio antennas 100.

The radio antenna 100 is connected to a single adapter output 20 of the adapter 10 by an adapter antenna connector or bus 45. The single adapter output 20 is provided in one aspect with a standardised AISG connector. The adapter antenna connector 45 uses the RS485 interface standard to relay antenna line device (ALD) control signals and receive data from the radio antenna 100, such as measurement values or settings.

Generally, the radio antenna 100, the adapter 10 and the base stations 110a-c are co-located on a single site. It would be possible, however, for the base stations 110a-c to be remotely located and connected to the adapter 10 by means of, for example, fibre optics cables.

The base stations 110a-c are illustrative of the different types of base stations that can be used. For example, one or more telecommunications providers could use the same radio antenna 100 as another one of the telecommunications providers. In this case, for example, a first one of the base stations 100a would be operated by one of the telecommunications providers and another one of the base stations 100b would be operated by another one of the telecommunications providers. In a further example, different systems (GSM/UMTS/WCDMA) operated by the same telecommunications provider can use the same radio antenna 100. The different systems would have different base stations 100a or 100b. Some of the base stations 100a-c do not have the functionality of generating control signals for the ALDs 100a-c. In this case, the adapter 10 can also be connected to a primary control device, which supplies the control signals, as will be explained later.

The term "base station" in this context is used to mean not only base stations, as known from the GSM protocol, but it is also intended to include node Bs as specified in the UMTS standards, and similar other base stations used in other types of mobile telecommunications systems.

An RF feed line 105a is connected between the base station 110a of FIG. 1 and the radio antenna 100. It will be appreciated that similar RF feed lines will be connected between other ones of the base stations 110b-c, but these are not shown on FIG. 1 for simplicity. FIG. 4 shows various aspects of the connections of the base stations 100a-c to the adapter 10. Similar reference numerals are used on FIG. 4 as those on FIG. 1 to identify the same elements. The base station 110a is connected by a feeder line 420a to a smart bias tee 410a which extracts the control signals from the RF signals. The RF signals are sent to and received from the radio antenna 100 by the RF feed line 105a whilst the control signals are sent over the adapter-base station connection 35a to the adapter 10.

The base station 110b has a direct serial output over the adapter-base station connection 35b to the adapter 10 for the transmission of control signals directly to the adapter 10. A separate RF feed line (not shown) will be connected to the base station 110b.

The base station 110c has no AISG functionality. In other words, the base station 110c cannot generate by itself the AISG control signals required to control the ALDs 100a-c and requires an external primary control device 440c to generate the AISG control signals. The base station 110c is connected through line 460c to a first smart bias tee 430c from which control signals from the external primary control device 440c are received along connection 450c. The first smart bias tee 430c is connected along connection 420c to a second smart bias tee 410c which the extracts the control signals for the adapter 10 from the RF signal. The RF signal is sent to the radio antenna 100 along a feeder line 105c whilst the control signals are sent to the adapter 10.

The adapter 10 has a plurality of microcontrollers 40a-c located within the adapter 10. In the radio antenna system 5 shown in the disclosure, three microcontrollers 40a-c are illustrated to correspond to the three base stations 110a-c. The microcontrollers 40a-40c are connected internally to the adapter inputs 30a-c by buses 32a-c and to the single adapter output 20 by buses 42a-c.

Figure 2:
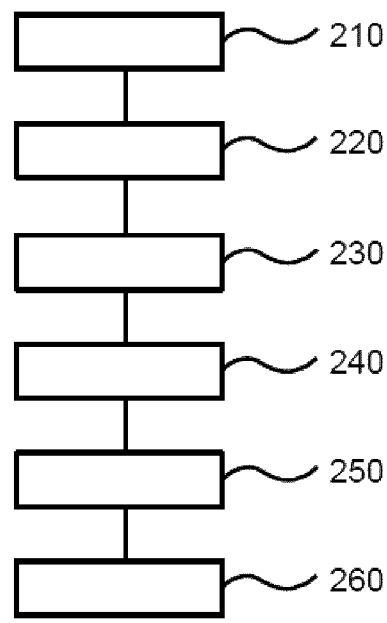
FIG. 2 shows a method for operating a radio antenna system
Figure 3:
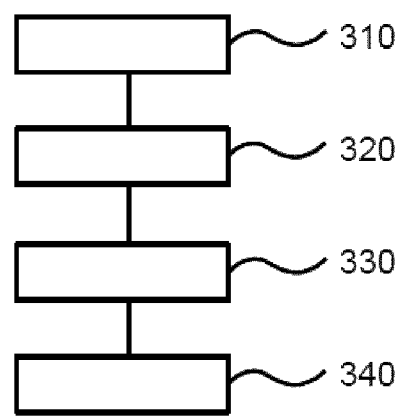
FIG. 3 shows a method for identification of the antenna line devices

The microcontrollers 40a-40c have a processing or management unit 44a-44c to process management signals and control signals from the base stations 110a-c to the radio antenna 100, as will be explained with reference to FIGS. 2 and 3. The processing unit 44a-44c may further be adapted to process antenna device signals from the radio antenna 100 and to the base stations 110a-c. The adapter 10 may also further comprise adapter logic 60 for managing and synchronizing outputs from the microcontrollers 40a-40c to the single adapter output 20.

It will be appreciated that more than three base stations 100-c can be connected to the adapter 10. In this case, the adapter 10 will include a larger number of microcontrollers 40a-c. Generally, there is one microcontroller 40a-c connected to each of the base stations 110a-c, although it would be possible for a single one of the microcontrollers 40a-c to be connected to several ones of the base stations 110a-c.

The operation of the radio antenna system 5 will now be described.

Suppose that one of the base stations 110a-c wishes to address one of the antenna line devices 100a-100c. This is illustrated in FIG. 2 in conjunction with the system of FIG. 1. For the purposes of explanation, only the addressing of a first one of the base station 110a to a first one of the antenna line devices 100a will be described.

The first base station 110a sends in step 210 antenna line device (ALD) control signals 215 to the adapter 10, via the adapter-base station connection 35a. The ALD control signals 215 are transmitted at a physical layer using RS-485 protocol and in conformity with the AISG protocols. The ALD control signals 215 are received in step 220 at the adapter input 30a and passed along the bus 32a to the microcontroller 40a in step 230.

The processing unit 44a of the microcontroller 40a can process the ALD control signals 215. The microcontroller 40a produces in step 240 a frame 245 with the control information from the ALD control signal 215 using device information about the antenna line devices 100a-100c in the radio antenna 100. The device information includes information about the installed antenna line devices 100a-c with a unique identification for the antenna line devices 100a-c and is stored in a memory of the microcontroller 40a.

The control information in the frame 245 is passed along the bus 42a to the single adapter output 20 and then to the radio antenna 100 in step 250 along the adapter antenna connection 45 using a bus implementing the RS 485 protocol. The control information in the frame 245 is transmitted using a protocol similar to the AISG protocol using unnumbered data packets.

The addressed antenna line device 100a-c reacts in step 260.

In order to ensure that only one of the microcontrollers 40a-c is sending the frame 245 to the antenna line devices 100a-c at the same time, the management unit 44a of the microcontroller 40a indicates to the other ones of the microcontrollers 40b and 40c in the adapter 10 that the microcontroller 40a is currently using the adapter antenna connector or bus 45. This indication is done by placing, for example, a high signal on one of the lines in the bus 45 or using a logically switched circuit. The other ones of the microcontrollers 40b, 40c can detect this high signal and know that the other microcontrollers 40b, 40c cannot send signals along the adapter 10 and adapter antenna connection 45 to any one of the antenna line devices 100a-c, whilst the microcontroller 40a is occupying the antenna adapter connection 45.

This blocking is only one example of the manner in which the microcontrollers 40a-c share the bus of the single adapter-antenna connection 45. It would of course be possible to conceive of other methods, such as a round robin sharing method in which each of the microcontrollers 40a-c are allocated a time slot over which the microcontrollers 40a-c can address ones of antenna line devices 100a-c. A time out facility can be included to ensure that any one of the microcontrollers 40a-c does not continually block the adapter-antenna connection 45 so that after a certain period of time, e.g. several milliseconds, the adapter antenna connection 45 is released for transmittal of frames 245 from another one of the base stations.

The adapter of the present invention relies on synchronisation for the transmission of the frames 245 between the adapter 10 and the plurality of antenna line devices 100a-c, thereby involving fewer resources than the prior art system where frequency multiplexing of the control signals was used.

The ALD control signals 215 from the base station 110a-c to the adapter 10 comprise numbered frames, as known from the AISG protocol. Other protocols could be used to transmit control signals, if required. The AISG control signals are standardised throughout the industry and thus allow the use of base stations 100a-c from different manufactures. The microcontrollers 40a-40c are therefore able to interpret the control signals from notable different types of the base stations 100a-c. A modified version of the AISG protocol can be used.

Suppose now that one of the antenna line devices 100a-c is newly installed or replaced in the radio antenna 100. This is illustrated on FIG. 3 together with the FIG. 1. The adapter 10 carries out in step 310 a binary tree scan of the ALDs 100a-c using a broadcast signal S1 comprising at least one frame along the adapter antenna connection 45 to the radio antenna 100. The broadcast signal S1 is received at step 320 and any one (or more) of the addressed ALDs 100a-c responds to the broadcast signal S1 by sending a response S2 to the adapter 10 in step 330. The response S2 is used to indicate to the individual microcontrollers 40a-40c the available ones of the ALDs 100a-c and, in particular, to indicate that a newly installed or replaced antenna line device 100a-c has been installed. This communication is carried out using the antenna interface standard group protocol (AISG) which includes device information about the installed antenna line device 100a-c plus a unique identification for the installed/replaced antenna line device 100a-c.

The microcontrollers 40a-40c store, at step 340, the device information and unique identification provided in the broadcast frame in a device information system with a storage unit as part of the management unit 40a-40c and are able to address the installed antenna line device 100a-c, as and when required.

The adapter 10 is adapted to retrieve the device information and the identification information of the antenna line devices 100a-c when turned on or on a regular basis, on initialisation or after a maintenance operation.

One or more of the antenna line devices 100a-c can be easily replaced. On replacement, there is no need to have a complete re-start of the antenna system 5. Suppose that the adapter 10 detects that one of the ALDs 100a-c is no longer responding, then the adapter 10 must scan all of the ALDs 100a-c to see whether any of the ALDs 100a-c have been replaced or are non-operational. This is done as explained with respect to FIG. 3.

The present system and method uses RS-485 standard between both the plurality of the primary control devices or the base stations 110a-c and the adapter 10, on the base station side, and between the adapter 10 and the plurality of antenna line devices 100a-c, on the antenna side. The adapter 10 is therefore transparent for/to the base stations 110a-c and is able to communicate via the bus 45 with the antenna line devices 100a-c.

The adapter 10 allows use of a plurality of co-located base stations 110a-c with a plurality of antenna line devices 100a-c, allowing for site sharing of the radio antenna system 5.

The invention claimed is:
1. An adapter comprising:
a single adapter output connected to at least one antenna line device by an adapter antenna connector;

at least two base station inputs, the at least two base station inputs being individually connected to at least one of a base station or a primary control device;

at least two microcontrollers, a first one of the microcontrollers being connected between a first one of the at least two base station inputs and the single adapter output, and a second one of the microcontrollers being connected between a second one of the at least two base station inputs and the single adapter output, wherein a corresponding one of the at least two microcontrollers includes a corresponding management unit for managing outputs from the corresponding one of the microcontrollers to the single antenna output, and wherein the corresponding one of the microcontrollers is adapted to indicate to another one of the microcontrollers that the corresponding one of the microcontrollers is currently using the adapter antenna connector.

2. An antenna system comprising
an adapter according to claim 1,
a plurality of antenna line devices connected to the single adapter output of the adapter by the adapter antenna connector.

3. The antenna system of claim 2, wherein the plurality of antennas line devices are daisy-chained together or arranged in a tree-like structure.

4. The antenna system of claim 2, wherein the plurality of antenna line devices further comprises at least one of a RET (remote electrical tilt) device, an azimuth sensor, a position sensor, or a temperature sensor.

5. The antenna system of claim 2, wherein communication between the adapter and at least one antenna line device is carried out using RS 485 interface.

6. The antenna system of claim 2, wherein at least one of the at least two microcontrollers is adapted to retrieve and store a device information and an identification information from the plurality of antenna line devices.

7. A method for operating at least one radio antenna having a plurality of antenna line devices from at least two base stations comprising:

receiving antenna line device control signals from at least one of the at least two base stations in a corresponding microcontroller in an adapter;

converting the antenna line device control signals in the corresponding microcontroller;

passing the converted antenna line device control signals to a single output of the adapter; and sending, via an adapter antenna connector, the converted antenna line device control signals to an addressed one of the at least one antenna line devices, comprising indicating by the corresponding microcontroller to another one of microcontrollers that the corresponding microcontroller is currently using the adapter antenna connector.

8. The method of claim 7, wherein the antenna line device control signals are sent using AISG (Antenna Interface Standard Group) signals.

* * * * *